United States Patent
Oga

(10) Patent No.: US 8,358,032 B2
(45) Date of Patent: Jan. 22, 2013

(54) ELECTRIC POWER SUPPLY SYSTEM

(75) Inventor: Toshiyuki Oga, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/006,872

(22) Filed: Jan. 14, 2011

(65) Prior Publication Data

US 2011/0115298 A1    May 19, 2011

Related U.S. Application Data

(63) Continuation of application No. 12/281,552, filed on Sep. 3, 2008, now Pat. No. 7,893,562.

(30) Foreign Application Priority Data

Mar. 3, 2006 (JP) .................................. 2006-058164

(51) Int. Cl.
*H02J 1/00* (2006.01)
(52) U.S. Cl. .......................................... 307/71; 320/117
(58) Field of Classification Search .................... 307/71; 320/117
See application file for complete search history.

(56) References Cited

U.S. PATENT DOCUMENTS

| | | | | |
|---|---|---|---|---|
| 6,326,768 B2 * | 12/2001 | Nagai et al. | .................... | 320/116 |
| 6,624,535 B2 * | 9/2003 | Morrow | .......................... | 307/71 |
| 7,893,562 B2 * | 2/2011 | Oga | ............................... | 307/71 |

FOREIGN PATENT DOCUMENTS

JP       05030662 A   *   2/1993

* cited by examiner

*Primary Examiner* — Daniel Cavallari

(57) ABSTRACT

In an electric power supply system, a plurality of batteries (405, 406) are connected in series by a switch group (402 to 404, 407 to 409), and a higher voltage and a lower voltage are output through a terminal and a VOL terminal, respectively, and are respectively converted in the voltage thereof by two step-down DC-DC inverters (105, 106). During a discharge operation upon a serial connection, remaining content of the batteries is measured in a period other than the period of discharge from the batteries (105, 106), and the connection mode of the serial connection is controlled based on the remaining content, to control the discharge of the respective batteries up to the discharge capacity.

14 Claims, 6 Drawing Sheets

DIODE TYPE

SWITCH TYPE

DIODE TYPE

SWITCH TYPE

ELECTRIC POWER SUPPLY SYSTEM

REFERENCE TO RELATED APPLICATION

This is a continuation application of U.S. patent application Ser. No. 12/281,552 filed Sep. 3, 2008 and claims the benefit of its priority.

TECHNICAL FIELD

The present invention relates to an electric power supply system and, more particularly, to an improvement of a power source unit for supplying an electric power to a DC-DC converter.

BACKGROUND ART

A DC-DC converter is used in an electric power supply system of portable information terminals including a cellular phone as a typical one. There are a variety of requests for the DC-DC converter as to the battery configuring the power source thereof, a control function for the battery, and a voltage conversion function for converting the power supplied from the battery to have a desired voltage, as will be described hereinafter. First request is to increase the retention time length of the battery. More specifically, it is requested to increase the time length, as much as possible, for supplying the power to the portable information terminal per a single cell in the case of the same primary battery, or per a single battery charge in the case of the same secondary battery. For this purpose, it is necessary to output the energy stored in the battery as much as possible and without leaving a remaining energy. For example, although the terminal voltage of the battery falls if the remaining content of the battery is reduced, the voltage conversion function, if any, that allows output of a desired voltage in spite of a lower input voltage will meet this request. However, in such a case, loss associated with the voltage conversion function must be suppressed to a minimum. That is, an efficient voltage conversion function is needed. In addition, use of the secondary battery requires storage of a larger amount of energy per a battery charge, and thus requires a charge function for achieving this storage.

Second request for the battery is to have a smaller size in particular for improvement of the portability thereof. If the size of battery is reduced, the battery capacity is inevitably reduced due to the trade-off. Accordingly, the above function for increasing the retention time length of the battery is desired again even for the purpose of reducing the size of the battery.

Third request is to output a plurality of different voltages and to control the stop of the output thereof. The potable information terminal requires a plurality of power sources used for, in addition to the typical information processing, the interface connecting to a network, analog signal processing such as video and audio signal processings, and in some case a drive unit such as a hard disk drive, which operate typically on different voltages. Moreover, it is preferable that those power sources be capable of being turned OFF for saving the power dissipation when the corresponding functions are not needed.

Fourth request is to have a variable function of the output voltage in some cases. In general, the power dissipation in a digital circuit is proportional to the operating-clock frequency and square of the source voltage. Accordingly, it is generally employed to reduce the operating-clock frequency for saving the power dissipation when a higher information-processing performance is not needed. In addition, since it is generally possible to operate the circuit even on a lower voltage under the lower operating-clock frequency, the source voltage is reduced for achieving a further power saving. Recently, the process for manufacturing semiconductor devices has developed a finer patterning rule, which maintains the existing high-operational speed even on a further reduced voltage.

In an analog circuit, the source voltage of a final-stage transistor in a power amplifier (PA) of a radio interface, for example, is the main factor based on which the maximum output electric power is to be determined. On the contrary, if a higher output electric power is not needed, the source voltage of the final-stage transistor is lowered to achieve a power saving. In the analog circuit, a higher output power is required along with the increase in the amount of transmitted information, contrary to the digital circuit. The increase of the amount of transmitted information requires the analog signal processing to have a lower distortion than ever. These facts require a higher source voltage than ever.

Fifth request is to cope with a wider range of variation in the battery voltage and a lower output voltage of the battery. The battery voltage is not always fixed at constant during the use thereof. Accordingly, the power source circuit must maintain a desired fixed output voltage that does not depend on the battery voltage, whereas the power source circuit is required to operate on a battery voltage lower than ever for the purpose of efficiently using out the battery capacity.

In these days, step-down DC-DC converters shown in FIG. 4 are used as the electric power supply system having a higher power conversion efficiency. FIG. 4(a) is the basic circuit diagram of a switch-type step-down DC-DC converter using a diode. In this figure, the output of battery 208 is connected to a choke coil 102 and diode 602 through a switch 101. Switch 101 performs an ON-OFF operation for the output of battery 208 based on the output of a DC/DC converter controller 601. When switch 101 is turned ON, current flows into choke coil 102 and is passed to a load side, and there arises a back electromotive force accompanying the same, whereby energy is stored in choke coil 102. Diode 602 is in an OFF state.

Subsequently, switch 101 is turned OFF, whereby there occurs a back electromotive force in choke coil 102, which is opposite in the direction to that during the ON state of switch 101. Thus, current flows from the ground via diode 602 and choke coil 102 to the load side for the output thereof. At this stage, diode 602 is in an ON state. Control for ON/OFF time ratio of switch 101 controls the output voltage of the converter. This output voltage is also fed to the DC/DC converter controller 601, and compared therein against a reference voltage (not shown) to obtain an error voltage, which is used for control of the output voltage. Since this technique uses the ON or OFF state of switch 101, there is substantially no power dissipation therein, thereby achieving a higher conversion efficiency.

FIG. 4(b) is such that diode 602 in FIG. 4(a) is replaced by a switch 301, which is controlled by a DC/DC converter controller 603. Switch 301 is controlled to be turned OFF when switch 101 is ON, and controlled to be turned ON when switch 101 is OFF, whereby switch 301 operates similarly to diode 602 in FIG. 4(a). In the circuit of FIG. 4(a), the electric power expressed by a product of the forward-biased voltage of the diode and the current flowing therethrough is consumed in diode 602 when diode 602 is ON, whereas in the circuit of FIG. 4(b), use of a MOSFET etc. as switch 301 further reduces the power dissipation during the ON state. As a result, the conversion efficiency of the DC-DC converter can be improved, while achieving suppression of heat generation. In this technique, if a lower output voltage is desired, the control of lowering the output voltage can be obtained at a higher speed, by turning switch 301ON to easily evacuate the charge stored on the load capacitor, such as a capacitor 103, to the ground plane.

As described heretofore, if a voltage lower than the battery voltage is to be generated from a battery, the switch-type step-down DC-DC converter can perform an efficient voltage conversion. However, in these days, there are an increasing number of circuits that require a source voltage higher than the battery voltage, as described before, and the step-down DC-DC converter, which cannot deliver an output voltage higher than the battery voltage, cannot deal with such a case.

Thus, there may be considered a technique wherein at least two batteries are connected in series to deliver a higher output voltage, which is efficiently converted in the voltage thereof by using the step-down DC-DC converter. However, in this case, the range of variation in the capacity between the serially connected batteries causes that the overall discharge capacity of the batteries (quantity of the electricity which can be discharged from the batteries) connected in series during the discharge is determined by the capacity of the battery having a lowest discharge capacity, whereby the discharge capacity of all the batteries cannot be effectively used out. In the case of secondary batteries, the overall charge capacity of the batteries (quantity of the electricity which can charge the secondary batteries) connected in series during the charge is determined by the secondary battery having a lowest charge capacity, whereby the charge capacity of the individual secondary batteries cannot be used out. If batteries having a variety of discharge capacities or charge capacities are combined together, an over discharge and an overcharge will likely to occur in the battery having a lowest discharge capacity and the battery having a lowest charge capacity, respectively, thereby causing degradation of the battery. If the batteries are subjected to selection for sorting to reduce the range of variation, it raises the cost. Moreover, since the characteristics vary with aging etc., the range of variation occurs after the selection for sorting.

In consideration of the above, step-up DC-DC converters shown in FIG. 5 are cited as devices that can deliver, from a single battery, an output voltage higher than the battery voltage. FIG. 5(a) shows the basic circuit of the step-up DC-DC converter using a diode.

In FIG. 5(a), the output of battery 208 is connected to switch 701 and diode 704 through choke coil 702. Switch 701 intermittently connects the output-side terminal of choke coil 702 to the ground due to the control by a DC/DC converter controller 705. When switch 701 is turned ON, current flows into choke coil 702, accompanying generation of a back electromotive force, and at the same time, storage of energy in choke coil 702. At this stage, diode 704 is in an OFF state. When switch 701 is subsequently turned OFF, an electromotive force which is opposite to that generated upon the ON state of switch 701 is generated in choke coil 702, whereby a voltage that is a sum of the voltage of battery 208 and the electromotive force of choke coil 702 is output through diode 704. At this stage, diode 704 is in an ON state. The output voltage can be adjusted by controlling the ON/OFF time ratio of switch 701. The output voltage is delivered also to the DC/DC converter controller 705, whereby the output voltage is adjusted by using an error voltage that is obtained by comparing the output voltage against a reference voltage (not shown).

FIG. 5(b) is such that diode 704 shown in FIG. 5(a) is replaced by a switch 706, which is controlled by the DC/DC converter controller 707. Switch 706 is controlled to be turned OFF when switch 701 is ON, and to be turned ON when switch 701 is OFF, whereby switch 706 operates similarly to diode 704 shown in FIG. 5(a). When diode 704 is ON in the circuit of FIG. 5(a), an electric power that is expressed by a product of the forward biased voltage of the diode and the current flowing therethrough is consumed in diode 704, whereas in the circuit shown in FIG. 5(b), use of a MOSFET etc. as switch 706 further reduces the power dissipation during the ON state. As a result, the conversion efficiency of the DC-DC converter can be improved further, while suppressing generation of heat. Since the voltage drop in switch 706 can be lowered compared to the forward biased voltage drop of diode 704, a higher output voltage can be obtained.

However, in the step-up DC-DC converters of FIG. 5, an output voltage that is lower than the battery voltage cannot be delivered. FIG. 6 shows a step-up/down DC-DC converter wherein the switch-type step-down and step-up DC-DC converters are combined together as a technique for solving the above problem, wherein some of the circuit sections are shared therebetween.

In FIG. 6, if the desired output voltage is lower than the battery voltage, switches 101 and 301 and choke coil 102 operate as a switch-type step-down DC-DC converter similarly to the converter of FIG. 4(b). At this stage, switch 701 is OFF and switch 706 is ON. On the other hand, if the desired output voltage is higher than the battery voltage, choke coil 102 and switches 701 and 706 operate as a step-up DC-DC converter similarly to the converter of FIG. 5(b). At this stage, switch 101 is ON and switch 301 is OFF.

As described heretofore, when the step-up/down DC-DC converter shown in FIG. 6 is used, the range of output voltage is not restricted by the battery voltage and thus may be set to a wider range. However, there are problems as recited hereinafter.

First, the value of current output from the battery is higher than the output current. This is because energy is stored in choke coil 102 and thus the current is not output during the ON state of switch 701, for delivering the current during the remaining period. Thus, the burden on the battery is increased. This is conspicuous at the stage of starting the step-up/down converter and the stage of raising the output voltage.

In addition, when the output voltage is in the vicinity of the battery voltage, switching occurs between the step-up mode and the step-down mode, which fact increases the number of operations for evacuating the charge to the ground, thereby reducing the power conversion efficiency.

As described above, if it is desired to obtain a higher voltage than the battery voltage, there are problems in the conventional electric power supply system, which will be recited hereinafter.

The first problem is such that if at least two batteries connected in series are used in order to obtain the higher voltage, it impossible to effectively use out the discharge capacity of all the batteries. This is because the overall discharge capacity of the batteries is determined by the battery having a smallest discharge capacity due to the range of variation in the discharge capacity among the batteries connected in series.

The second problem is such that if at least two secondary batteries connected in series are used in order to obtain the higher voltage, it is impossible to effectively use out the overall charge capacity of all the batteries. This is because the overall charge capacity of the batteries is determined by the battery having a smallest charge capacity due to the range of variation in the charge capacity among the secondary batteries connected in series.

The third problem is such that if at least two secondary batteries connected in series are used in order to obtain the higher voltage, batteries are likely to be deteriorated. This is because batteries having a range of variation in the discharge capacity or charge capacity are combined together, and accordingly an over discharge is likely to occur in the battery having a lowest discharge capacity and an overcharge is likely to occur in the battery having a lowest charge capacity.

The fourth problem is such that it is difficult to select batteries for sorting in order to suppress the range of variation in the discharge capacity or charge capacity for the batteries that are connected in series to obtain the higher voltage. This is because selection of the batteries for sorting raises the cost. In addition, the characteristics vary along with the aging, and the range of variation occurs even after the selection for sorting.

JP-2002-345161A describes a technique wherein a battery block configured by a plurality of batteries (cells) is subjected to measurement of the cell voltage for each cell, and if the cell voltage is higher than the average voltage, a discharge switch for the cell is turned ON, to thereby discharge the cell current through a discharge resistor and equalize the cell voltages. In this technique, however, electric power of the batteries is wasted.

The fifth problem is such that if a step-up DC-DC converter is employed instead of connecting a plurality of secondary batteries in series to thereby obtain the higher voltage, it is impossible to output a voltage lower than the battery voltage, whereas if a step-up/down DC-DC converter is employed, the power conversion efficiency is lowered at a voltage in the vicinity of the battery voltage.

SUMMARY OF THE INVENTION

In view of the above, it is an object of the present invention to provide an electric power supply system configured by a plurality of secondary batteries connected in series for obtaining a higher voltage, which is capable of removing influence by the range of variation in the discharge capacity, charge capacity, etc. of the batteries connected in series, to perform an efficient charge or discharge thereof.

The present invention provides an electric power supply system including: first and second batteries; and a power source unit for outputting a first source voltage obtained by connecting the first battery and the second battery in series and outputting a terminal voltage of one of the first and second batteries connected in series as a second source voltage, wherein the power source unit includes a switch group for switching between a first mode selecting the first battery as the one of the batteries and a second mode selecting the second battery as the one of the batteries.

In accordance with the electric power supply system of the present invention, one of the first and second batteries which has a larger remaining content is selected as the one of the batteries when the switch group connects the first and second batteries in series to output the first and second source voltages, whereby the one of the batteries supplies a larger current therefrom, to balance the remaining content between the batteries and allow an efficient discharge.

BEST MODE OF CARRYING OUT THE INVENTION

Figure 1:
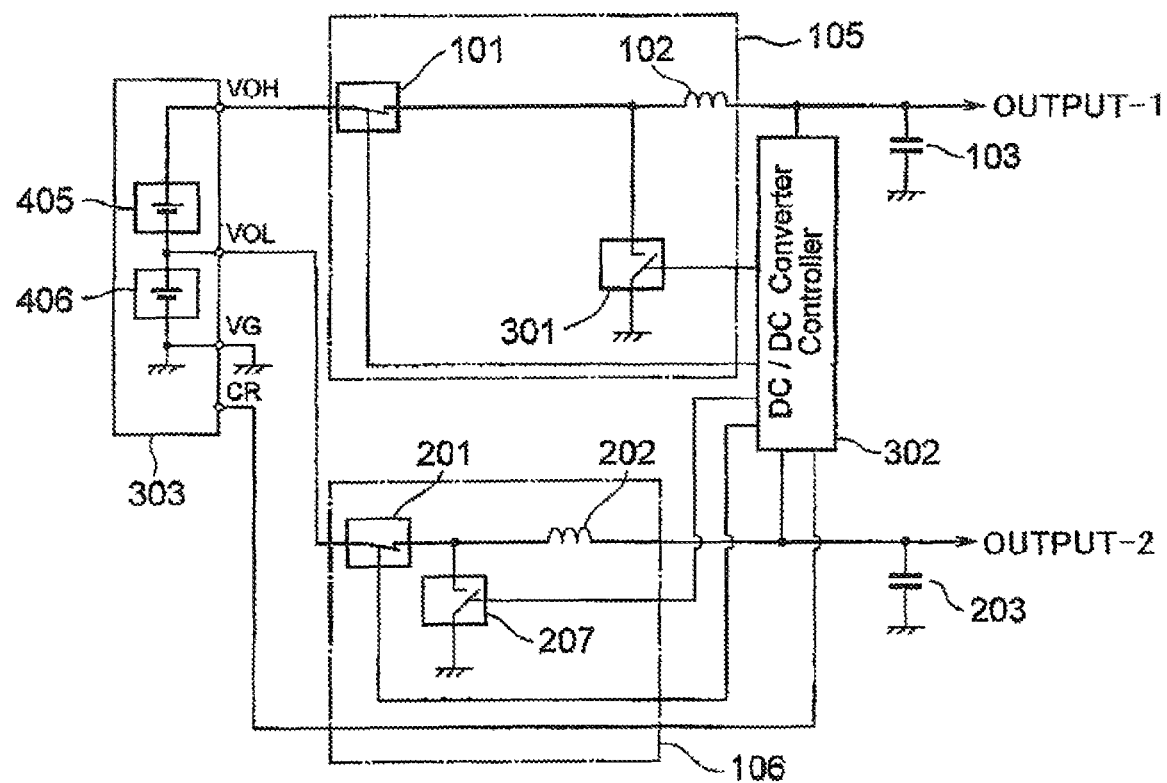
FIG. 1 is a circuit diagram of an electric power supply system according to a first exemplary embodiment of the present invention.

Hereinafter, exemplary embodiments of the present invention will be described with reference to the drawings. FIG. 1 shows an electric power supply system according to a first exemplary embodiment of the present invention. In the same drawing, the electric power supply system of the present embodiment includes switches 101, 201, 207 and 301, choke coils 102 and 202, a DC/DC converter controller 302, capacitors 103 and 203, and a battery section (power source unit) 303. Switch 101, choke coil 102 and switch 301 configure a first DC-DC converter 105, whereas switch 201, choke coil 202 and switch 207 configure a second DC-DC converter 106. The battery section 303 includes two batteries of the same type, and includes a high-potential output terminal VOH which supplies a first source voltage from a high-potential terminal of one of the batteries connected on a high-potential side when both the batteries are connected in series, and a low-potential output terminal VOL which supplies a second source voltage from the high-potential terminal of the other of the batteries connected on a low-potential side.

The high-potential output terminal VOH of the battery section 303 is connected to choke coil 102 and switch 301 via switch 101 of the first converter. Switch 101 receives the high-potential output VOH of the battery section 303, receives a first switch signal from the DC/DC converter controller 302, and delivers the output electric power to choke coil 102 and switch 301. The output of choke coil 102 is delivered as a first output (output-1) of the electric power supply system while being delivered to the DC/DC converter controller 302 and capacitor 103. Switch 301 receives a second switch signal of the DC/DC converter controller 302, and is inserted between the output of switch 101 and the ground (ground plane).

The low-potential output terminal VOL of the battery section 303 is connected to switch 201 of the second converter. Switch 201 receives an output from terminal VOL of the battery section 303 and a third switch signal from the DC/DC converter controller 302, and delivers the output electric power to choke coil 202 and switch 207. The output of choke coil 202 is delivered as a second output (output-2) of the electric power supply system while being delivered to the DC/DC converter controller 302 and capacitor 203. Switch 207 receives a fourth switch signal of the DC/DC converter controller 302, and is connected to the output of switch 201 and the ground plane.

Figure 2:
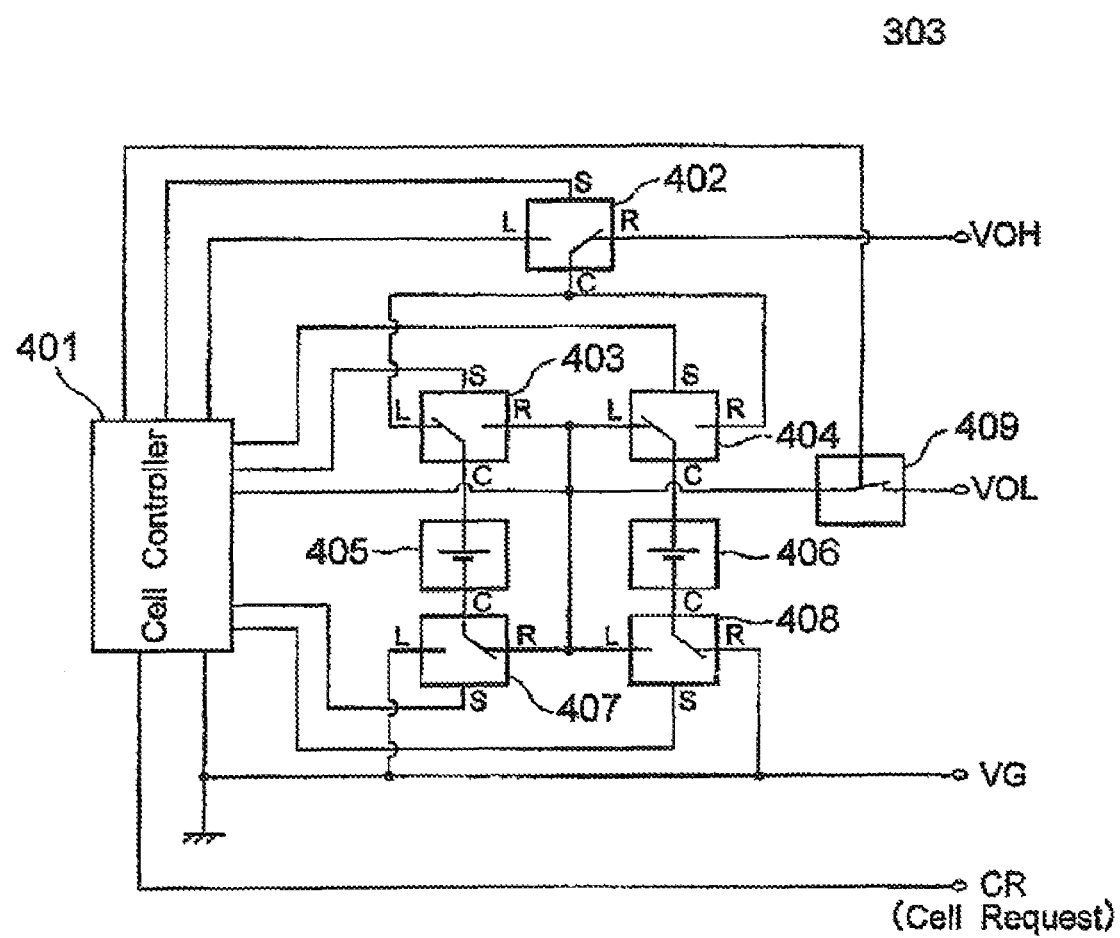
FIG. 2 is a circuit diagram showing the detail of the battery section shown in the electric power supply system of FIGS. 1 and 3.

The battery-section control signal delivered from the DC/DC converter controller 302 is delivered to a CR terminal of the battery section 303. FIG. 2 shows the detail of the battery section 303 shown in FIG. 1. The battery section 303 includes two batteries 405 and 406, double-throw switches 402 to 404, 407 and 408 that control connection of the batteries, a single-throw switch 409, and a cell controller 401.

In FIG. 2, battery 405 is inserted between the C-terminals (common terminals) of both the switches 403 and 407, whereas battery 406 is inserted between the C-terminals of both the switches 404 and 408. L-terminal of switch 403 and R-terminal of switch 404 are connected to the C-terminal of switch 402. L-terminal of switch 407 and R-terminal of switch 408 are grounded. R-terminal of switch 403, L-terminal of switch 404, R-terminal of switch 407 and L-terminal of switch 408 are connected together and to the cell controller 401 and one of the terminals of switch 409. The other terminal of switch 409 is connected to the low-potential output terminal VOL. L-terminal of switch 402 is connected to the cell controller 401, and R-terminal thereof is connected to the high-potential output terminal VOH. S-terminal (control terminal) of each switch and the control terminal of switch 409 are connected to cell controller 401. The cell controller 401 is connected to a battery-section control-signal terminal (CR), and receives the battery-section control signal configured by a serial signal from the DC/DC converter controller 302.

Next, operation of the first exemplary embodiment will be described with reference to FIG. 1. The electric power output from the high-potential output terminal VOH of the battery section 303 is lowered in voltage thereof by the first step-down DC-DC converter configured by the DC/DC converter controller 302, switches 101 and 301, choke coil 102 and capacitor 103, and is delivered through the output-1 terminal as a first output. Thus, the maximum voltage which can be set for the output-1 terminal is the voltage on the high-potential output terminal VOH.

The electric power output from the low-potential output terminal VOL of the battery section 303 is lowered in the voltage thereof by the second step-down DC-DC converter configured by the DC/DC converter controller 302, switches 201 and 207, choke coil 202 and capacitor 203, and is delivered through the output-2 terminal as a second output. Thus, the maximum voltage which can be set for the output-2 terminal is the voltage on the low-potential output terminal VOL.

Moreover, the DC/DC converter controller 302 generates the battery-section control signal, and delivers the same to the battery-section control-signal terminal (CR) of the battery section 303. The battery-section control signal includes information of the timing at which switch 101 or switch 201 assumes an ON state, and information indicating the length of the ON/OFF interval of these switches. When switch 101 or switch 201 is ON, electric power is delivered from the battery section 303, whereas when switch 101 or switch 201 is OFF, the battery section 303 need not output the electric power, and accordingly, configuration of the battery section 303 may be changed or the charged amount may be monitored in this period.

With reference to FIG. 2, the detail of operation of the battery section 303 will be described. Batteries 405 and 406 are connected in series via switches 403, 404, 407 and 408 during a discharge operation. Switches 403, 404, 407 and 408 are respectively controlled by the control signal from the cell controller 401 so that it is determined which one of the batteries 405 and 406 connected in series is on the high potential side.

The voltage obtained upon the serial connection of the batteries 405 and 406 is delivered from the high-potential output terminal VOH via switch 402. Switch 402 performs switching that couples the C-R terminals during a discharge operation and couples the C-L terminals during non-discharge and charge operations, based on the control signal from the cell controller 401. The voltage on the node which connects together the batteries 405 and 406 is delivered from output terminal VOL via switch 409. Switch 409 performs an ON/OFF operation based on the control signal from the cell controller 401.

The cell controller 401 controls those switches so that the electric power is delivered from the high-potential output terminal VOH and low-potential output terminal VOL when the battery-section control signal requests the discharge. When the battery-section control signal does not request output of the electric power, the inter-terminal voltage of each of the batteries 405 and 406 is measured, which one of the batteries has a larger remaining content is determined, and the connection during the next output is determined so that one of the batteries having a larger remaining content is connected on the lower potential side. The battery on the high potential side bears a burden of only the output current from the high-potential output terminal VOH, whereas the battery on the low potential side bears a burden of the output current from both the high-potential output terminal VOH and output terminal VOL. For this reason, the battery on the low potential side is exhausted more quickly compared to the battery on the high potential side. The cell controller 401 monitors the remaining content of the batteries 405 and 406, and discharges one of them having a larger remaining content in a preferential order, whereby the batteries 405 and 406 can discharge all the charge thereof irrespective of the difference in the capacity thereof caused by the range of variation.

On the other hand, the cell controller 401 includes therein a battery charge circuit, which is capable of charging the batteries independently of each other by using switches 403, 404, 407 and 408, while assuring the charged amount of each battery via the L-terminal of switch 402 upon charge of the batteries. Therefore, the cell controller 401 can charge the batteries up to the predetermined capacity irrespective of the difference in the capacity between the batteries 405 and 406.

In the electric power supply system of the above exemplary embodiment, the first DC-DC converter receives the power supply from the high-potential output terminal (VOH) of the battery section 303 based on the control of the DC/DC converter controller 302 to convert the voltage thereof and generate a first voltage output. In addition, the second DC-DC converter receives the power supply from the low-potential output terminal (VOL) of the battery section 303 based on the control of the DC/DC converter controller 302, to convert the voltage thereof and generate a second voltage output. This allows output of a voltage equal to or exceeding the voltage of a single cell, and output of a plurality of voltages.

The DC/DC converter controller 302 receives the first voltage, and outputs a control signal for converting the same into a desired voltage toward switches 101 and 301 of the first DC-DC converter. The DC/DC converter controller 302 also receives the second voltage and outputs a control signal for converting the same into a desired voltage toward switches 201 and 207 of the second DC-DC converter. The DC/DC converter controller 302 notifies the timing, at which at least one of switches 101 and 201 of both the DC-DC converters is turned ON, to the cell controller 401 as a cell-output request signal. If the DC/DC converter controller 302 detects or anticipates that the ON/OFF interval of switches 101 and 201 of both the DC-DC converters assumes a first specified value or above, it outputs a battery-switch control signal. If it detects or anticipates that the ON/OFF interval of switches of both the DC-DC converters assumes a second specified value or above that is larger than the second specified value, it outputs a charge-switch control signal. Here, the "ON/OFF interval" means a time interval between two series of operation assuming that a series of operation includes a change from an OFF state to an ON state and a subsequent change from the ON state to another OFF state, i.e., a time length of the OFF state. "To anticipate the ON/OFF interval" means a state wherein the DC/DC converter controller 302, for example, receives beforehand an instruction, such as stop of the output, from an external control system (not shown) that controls the electric power supply system, and thus recognizes it.

The cell controller 401 measures the remaining content of each battery, when the cell-output request signal is not generated. Measurement of the remaining content is performed by measuring the terminal voltage of each battery. If the battery switch signal is generated, connection of the batteries is switched so long as the measured result of the remaining battery content requests switching of the battery connection. When a charge switch signal is generated, connection of the batteries is switched from a discharge mode to a charge mode at a timing at which the cell-output request signal is not generated. Again in this charge mode, the measurement of remaining content of the batteries is performed and the batteries are charged up to respective charge capacities independently of each other.

In the electric power supply system of the above exemplary embodiment, since the cell controller 401 and switches 403, 404, 407 and 408 are provided therein, the serial order of the batteries 405 and 406 can be changed, and the electric power of an intermediate voltage can be output from the serial connection node, whereby discharge of the batteries can be controlled independently of each other, while assuring the remaining content of the respective batteries. Thus, all the capacity can be discharged irrespective of the difference in the remaining content between the batteries.

In the present embodiment, due to arrangement of the cell controller 401 and switches 402, 403, 404, 407, 408 and 409 therein, the batteries can be charged independently of each other while assuring the charged amount of the batteries. Therefore, the batteries can be charged up to the upper limit (charge capacity) of the batteries irrespective of the difference in the remaining content between the batteries. It is to be noted that although the above exemplary embodiment is described with reference to the case of two batteries, an arbitrary number of batteries such as three or more may be selected as desired, and the number of DC-DC converters may also be selected in accordance therewith.

Figure 3:
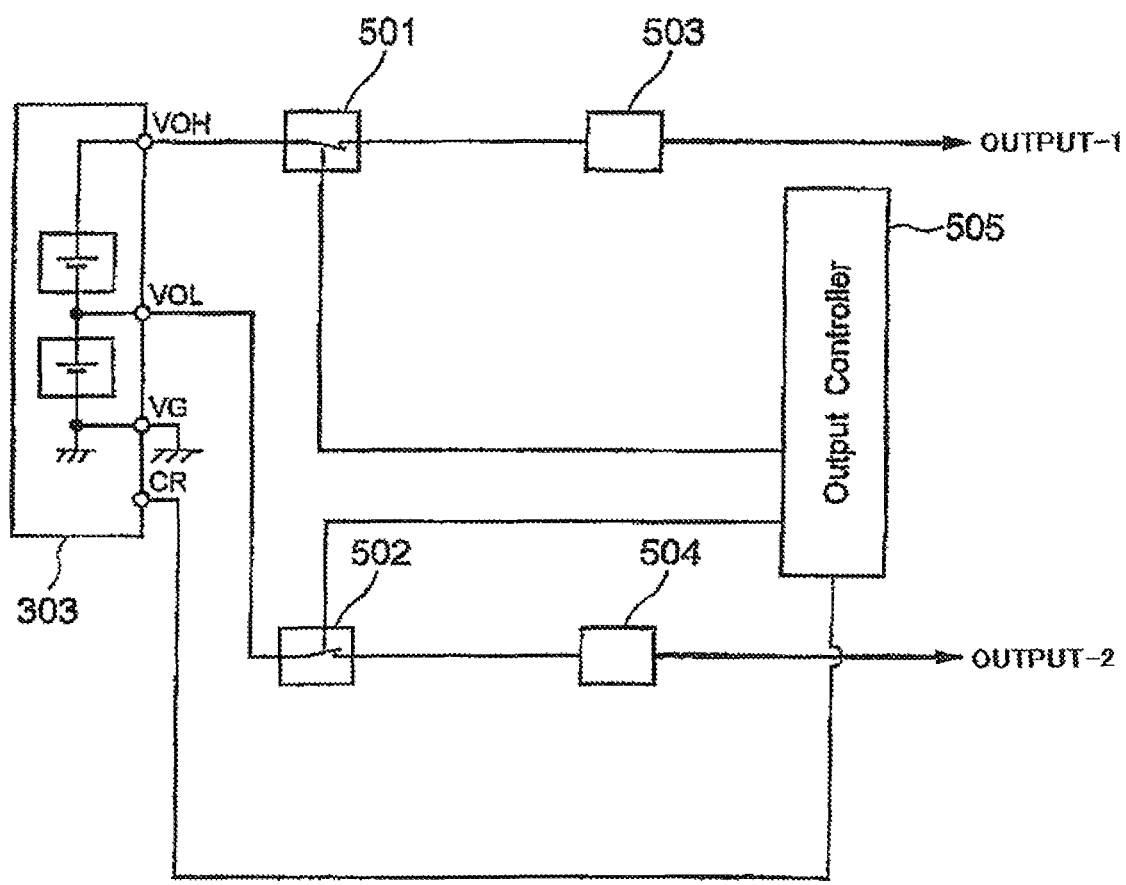
FIG. 3 is a circuit diagram of an electric power supply system according to a second exemplary embodiment of the present invention.
Figure 4A:
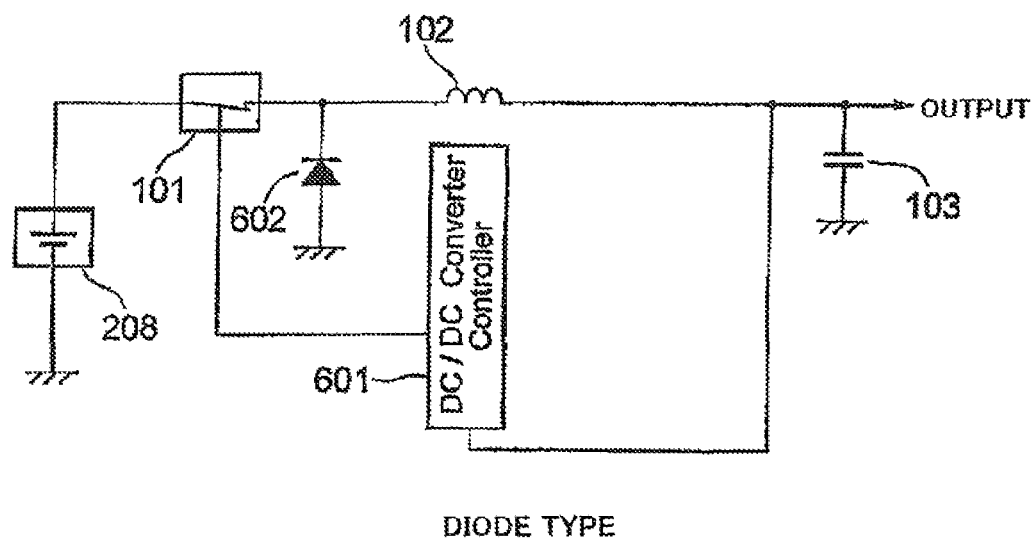
FIGS. 4(a) and 4(b) are circuit diagrams of conventional step-down DC-DC converters.
Figure 4B:
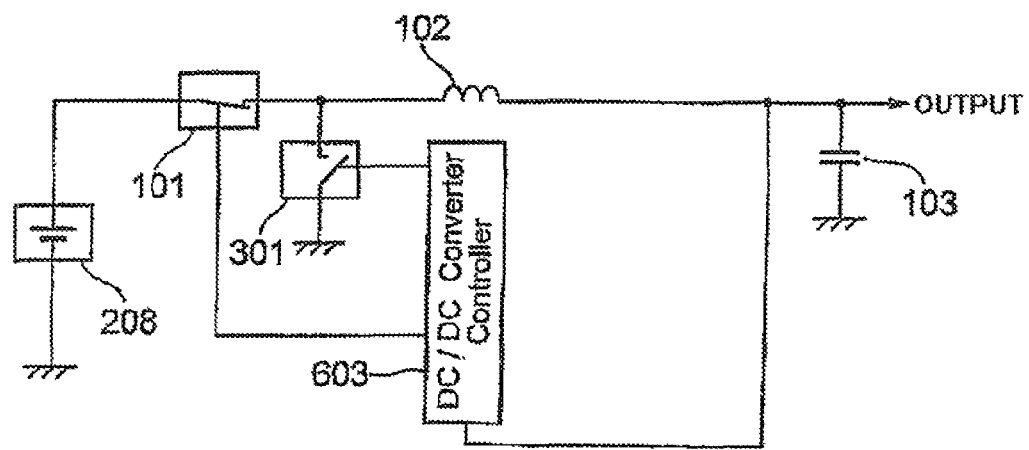
Figure 5A:
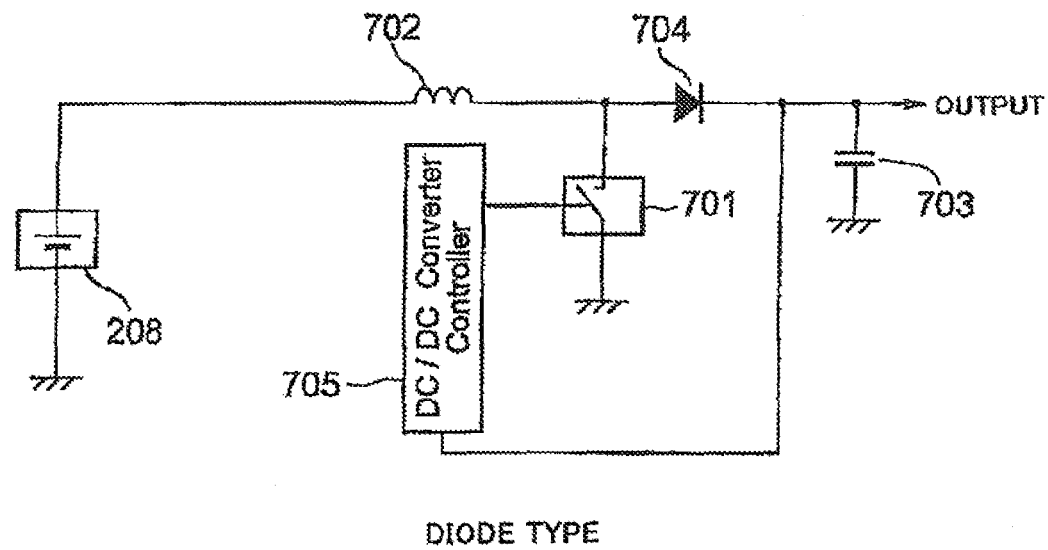
FIGS. 5(a) and 5(b) are circuit diagrams of conventional step-up DC-DC converters.
Figure 5B:
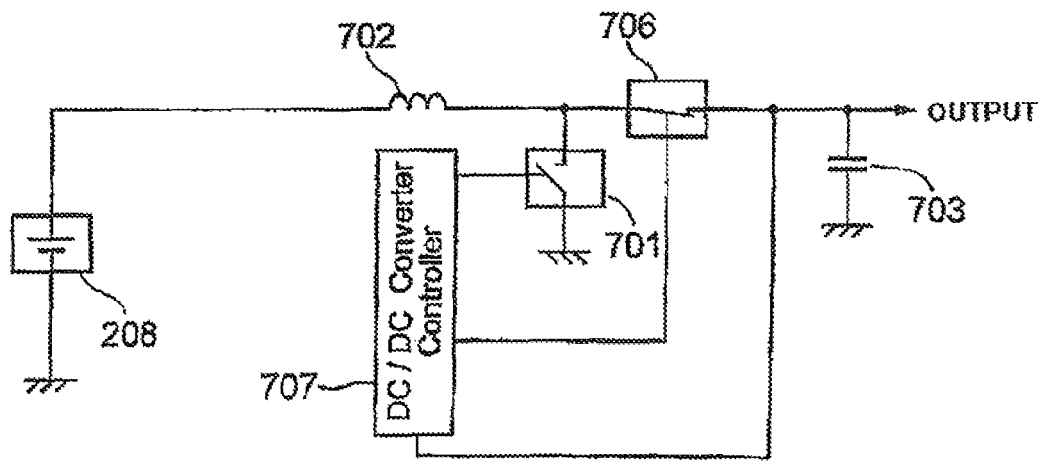
Figure 6:
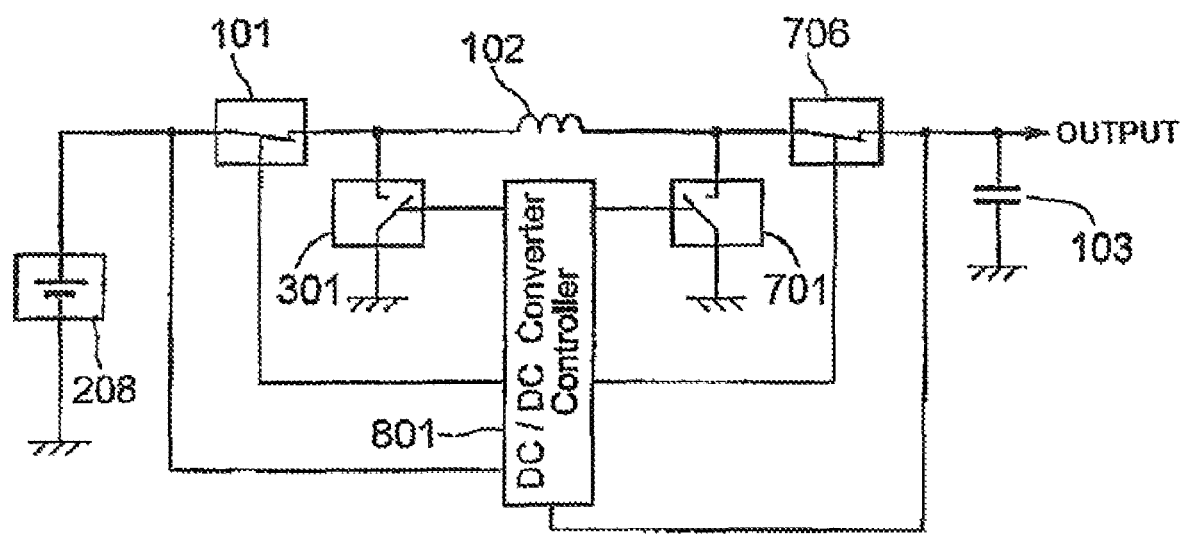
FIG. 6 is a circuit diagram of a conventional step-up/down DC-DC converter.

Next, another exemplary embodiment of the present invention will be described. FIG. 3 shows an electric power supply system according to a second exemplary embodiment of the present invention. In the same figure, the electric power supply system of the present embodiment includes switches 501 and 502, linear regulators 503 and 504, an output controller 505, and a battery section (power source unit) 303. Linear regulator 503 configures a first DC-DC converter, whereas linear regulator 504 configures a second DC-DC converter. Since the battery section 303 is similar to that in the first exemplary embodiment, description thereof is omitted here.

The high-potential output terminal VOH of the battery section 303 is connected to linear regulator 503 via switch 501. Switch 501 receives the high-potential output VOH of the battery section 303, receives a first switch signal from the output controller 505, and delivers the output electric power to linear regulator 503. The output of linear regulator 503 is delivered as the first output (output-1) of the electric power supply system.

The low-potential output terminal VOL of the battery section 303 is connected to switch 502. Switch 502 receives an output from terminal VOL of the battery section 303, receives a second switch signal from the output controller 505, and delivers the output electric power to linear regulator 504. The output of linear regulator 504 is delivered as the second output (output-2) of the electric power supply system.

The battery-section control signal delivered from the output controller 505 is delivered to the CR terminal of the battery section 303. Since the battery section 303 is similar to that in the first exemplary embodiment, the detailed description thereof is omitted here.

Next, operation of the electric power supply system of the second exemplary embodiment will be described with reference to FIG. 3. The electric power output from the high-potential output terminal VOH of the battery section 303 through switch 501 is lowered in the voltage thereof by linear regulator 503 configuring the first step-down DC-DC converter, and delivered from the output-1 terminal as the first output. Therefore, the maximum voltage which can be set for the output-1 terminal is the voltage on the high-potential output terminal VOH.

Switch 501 receives the first switch signal from the output controller 505, and performs in accordance therewith connection or disconnection between the high-potential output terminal VOH of the battery section 303 and the linear regulator 503.

The electric power output from the low-potential output terminal VOL of the battery section 303 through switch 502 is lowered in the voltage thereof by linear regulator 504 configuring the second step-down DC-DC converter, and delivered from the output-2 terminal as the second output. Thus, the maximum voltage which can be set for the output-2 terminal is the voltage on the low-potential output terminal VOL. Switch 502 receives the second switch signal from the output controller 505, and performs in accordance therewith connection or disconnection between the low-potential output terminal VOL of the battery section 303 and the linear regulator 504.

The output controller 505 generates the battery-section control signal, and delivers the same to the battery-section control-signal terminal (CR) of the battery section 303. The battery-section control signal includes information of the timing at which switch 501 or switch 502 assumes an ON state, and information indicating the time length of the ON/OFF interval of those switches. When switch 501 or switch 502 is ON, electric power is output from the battery section 303, whereas battery section 303 need not output the electric power during the OFF state thereof, and accordingly, configuration of the battery section 303 may be changed, and the amount of charge may be monitored in this period.

In the electric power supply system of the above second exemplary embodiment, linear regulator 503 configuring the first DC-DC converter receives the high-potential output terminal of the battery section 303 based on the control of the output controller 505, converts the voltage thereof to generate the output of the first voltage. Linear regulator 504 configuring the second DC-DC converter receives supply of the electric power from the low-potential output terminal (VOL) of the battery section 303 in accordance with the control of the output controller 505, converts the voltage thereof to generate the output of the second voltage. This allows output of a voltage equal to or above the battery voltage, and output of a plurality of voltages.

The output controller 505 notifies the timing at which at lest one of switch 501 and switch 502 is turned ON to the cell controller 401 as a cell-output request signal. If the output controller 505 detects or anticipates that the ON/OFF interval of switch 501 and switch 502 assumes a first specified value or above, it delivers a battery-switch control signal. If the output controller 505 detects or anticipates that the ON/OFF interval of both switches 501 and 502 assumes a second specified value or above which is larger than the first specified value, it delivers a charge-switch control signal. Here, the "ON/OFF interval" means a time interval between two series of operation assuming that a series of operation includes a change from an OFF state to an ON state and a subsequent change from the ON state to another OFF state, i.e., a time length of the OFF state. "To anticipate the ON/OFF interval" means a state wherein the DC/DC converter controller 302, for example, receives beforehand an instruction, such as stop of the output, from an external control system (not shown) that controls the electric power supply system, and thus recognizes it.

In the electric power supply system of the above second exemplary embodiment, since the linear regulator is used as a DC-DC converter which performs voltage conversion, switching noise that generally exists in the switch-type DC-DC converter is not generated, whereby the switching noise does mix into the output.

The first advantage of the electric power supply system of the above exemplary embodiment is such that the burden on the battery is not significant even if a voltage exceeding the voltage of a single cell is delivered from the battery. This is because the voltage higher than the voltage of a single cell is delivered by connecting batteries in series, and thus it is not necessary to use a step-up/down DC-DC converter.

The second advantage of the electric power supply system of the above exemplary embodiment is such that the power conversion efficiency is not reduced in the case where the output voltage is in the vicinity of the voltage of a single cell. This is because a voltage equal to or higher than the voltage of a single cell is delivered by connecting batteries in series, and thus it is possible to obtain the output voltage by using a step-down DC-DC converter.

The third advantage of the electric power supply system of the above exemplary embodiment is such that the discharge capacity of all the batteries can be effectively used out when a plurality of batteries are connected in series for obtaining a higher voltage. This is because discharge of batteries can be controlled independently of each other by outputting an electric power having an intermediate voltage on the serial connection node while changing the serial order of the batteries and assuring the remaining content of the batteries, to control the amount of discharge from the batteries independently of each other, whereby the amount of discharge can be adjusted between both the batteries.

The fourth advantage of the electric power supply system of the above exemplary embodiment is such that the charge capacity of all the batteries can be effectively used when a plurality of batteries are connected in series for obtaining a higher voltage. This is because amount of charge can be adjusted by charging the batteries independently of each other while assuring the remaining content of the individual batteries.

The fifth advantage of the electric power supply system of the above exemplary embodiment is such that batteries are hardly deteriorated when a plurality of batteries are connected in series for obtaining a higher voltage. This is because there scarcely occurs an overcharge or over discharge due to performing adjustment of charge and discharge of the individual batteries.

The sixth advantage of the electric power supply system of the above exemplary embodiment is such that it is not necessary to select batteries for sorting to suppress the range of variation in the charged amount or discharged amount for the batteries which are connected in series for obtaining a higher voltage. This is because the range of variation among the batteries can be absorbed due to performing adjustment of charge and discharge of individual batteries while assuring the remaining content of the individual batteries.

The seventh advantage of the electric power supply system of the above exemplary embodiment is such that switching noise hardly mixes into the output. This is because a linear regulator is used for voltage conversion.

As described with respect to the exemplary embodiment, an electric power supply system according to a preferred exemplary embodiment of the present invention may include, in addition to the configuration of the present invention, a first converter that converts the first power supply voltage into a first output voltage, and a second converter that converts the second power supply voltage into a second output voltage. By providing different power supply voltages to the converters, the configuration of the electric power supply system outputting different output voltages can be simplified. The converters are not limited to DC-DC converters, and a DC-AC converter may be employed.

It is also a preferable configuration of the present invention that the power source unit includes a remaining-content measurement section that measures a remaining content of the first and second batteries during a discharge operation, and the switch group selects one of the first and second batteries having a larger remaining content as the first battery based on a result of measurement by the remaining-content measurement section. This allows a self-sustaining balance for the remaining content between both the batteries in the electric power supply system.

It is also a preferable configuration of the present invention to further include a monitor unit that monitors an ON/OFF interval of switches included in or connected to the first and second converters, wherein the remaining-content measurement section measures the remaining content of the first and second batteries after the monitor unit detects or anticipates an ON/OFF interval having a specific value or above. It is easy to obtain the timing for switching the connection of batteries by the switch group after measurement of the remaining content of the batteries, if the ON/OFF interval is long.

The switch group performs switching between the first mode and the second mode at a timing when any of switches included in or connected to the first and second converters assumes an OFF state. Switching in accordance with the operation of both the converters alleviates the influence provided on the load side by the electric power supply system.

It is also preferable that the switch group connect the first and the second batteries in a third mode in which the first and second batteries are charged independently of each other after the monitor unit detects or anticipates an ON/OFF interval having the specific value or above. Similarly, the influence on the load side by the electric power supply system can be alleviated.

It is preferable that the remaining-content measurement section further measure a remaining content of the first and second batteries after the switch group connects the first and second batteries in the third mode. In this case, the batteries can be charged up to the respective charge capacities, to thereby achieve an efficient charge.

It is also a preferable configuration of the present invention that each of the first and second converters is a step-down DC-DC converter. In this configuration of the electric power supply system, it is possible to output an arbitrary voltage so long as it is equal to or below the voltage obtained by a serial connection of the batteries. It is to be noted that one of them may be a step-up or step-up/down converter. This is because the range of variation in the charge capacity or discharge capacity of the batteries connected in series can be suppressed to achieve an efficient charge or discharge. In addition, the step-down converter is not limited to a switch-type one and may be a linear regulator (step-down type).

Further, at least one third battery may be further connected in series with the first and second batteries, and a third converter is provided therein, or the first and second batteries may be configured by the same number of batteries which are connected in series with or parallel to one another While the present invention has been described with reference to preferred exemplary embodiments thereof, the electric power supply system of the present invention is not limited to the configuration of the above exemplary embodiments, and various modifications and alterations from the above exemplary embodiments may fall within the scope of the present invention.

The invention claimed is:

1. An electric power supply system comprising:
   a battery section having first and second batteries, for outputting a first source voltage obtained by connecting said first battery and said second battery in series and outputting a second source voltage obtained from one of said first and said second batteries connected in series,
   wherein said battery section comprises:
      a switch group for switching between a first mode selecting said first battery as said one of said batteries and a second mode selecting said second battery as said one of said batteries; and
      a remaining-content measurement section that measures a remaining content of said first and said second batteries, where said switch group selects one of said first and said second batteries having the largest remaining content that outputs said second source voltage based on a result of measurement by said remaining-content measurement section.

2. The electric power supply system according to claim 1, further comprising a control unit that detects or anticipates off-timing in which said first source voltage and said second source voltage are cut off, to control said battery section.

3. The electric power supply system according to claim 2, wherein said remaining-content measurement section measures the remaining content of said first and said second batteries in said off-timing.

4. The electric power supply system according to claim 1, wherein said switch group connects said first and said second batteries to switch into a third mode in which said first and said second batteries are charged independently.

5. The electric power supply system according to claim 4, wherein said remaining-content measurement section further measures a remaining content of said first and said second batteries in said third mode.

6. The battery section comprised in the electric power supply system of claim 1.

7. A portable information terminal comprising the electric power supply system of claim 1.

8. An electric power supply system comprising:
   a battery section having first and second batteries, for outputting a first source voltage obtained by connecting said first battery and said second battery in series and outputting a second source voltage obtained from one of said first and said second batteries connected in series; and
   a control unit that detects or anticipates off-timing in which said first source voltage and said second source voltage are cut off;
   wherein said battery section comprises:
      a switch group for switching between a first mode selecting said first battery as said one of said batteries and a second mode selecting said second battery as said one of said batteries based on said off-timing detected or anticipated by said control unit.

9. The electric power supply system according to claim 8, wherein said switch group performs switching between said first mode and said second mode in said off-timing.

10. The electric power supply system according to claim 8, wherein said switch group connects said first and said second batteries to switch into a third mode in which said first and said second batteries are charged independently.

11. The electric power supply system according to claim 8, further comprising an off switch to cut off said first source voltage or said second source voltage controlled by said control unit.

12. The electric power supply system according to claim 11, further comprising a converter that converts said first source voltage into a first output voltage or converts said second source voltage into a second output voltage, wherein said off switch is a part of said converter.

13. The battery section comprised in the electric power supply system of claim 8.

14. A portable information terminal comprising the electric power supply system of claim 8.

* * * * *